Patented June 16, 1925.

1,542,014

UNITED STATES PATENT OFFICE.

CHARLES W. STICKEL, OF ROCHESTER, NEW YORK.

METHOD AND DEVICE FOR CRIMPING EYELASHES.

Application filed June 5, 1922. Serial No. 566,114.

*To all whom it may concern:*

Be it known that I, CHARLES W. STICKEL, a citizen of the United States, residing in Rochester, in the county of Monroe and State of New York, have invented new and useful Improvements in Methods and Devices for Crimping Eyelashes, of which the following is a specification.

This invention relates to a method and device for crimping the eye lashes of a person for the purpose of making the same appear more attractive and also to bend the same so that they do not obstruct the vision of the eye.

The principal object of this invention is to provide a method and device for turning up the ends of eye lashes so that they have the eye lids and the surrounding portion of the eye as a back ground and thus make the eye appear wider and also make the eye lashes appear longer.

Another object of this invention is to provide a device for this purpose which is of simple construction and capable of being easily manipulated for making a crimp in the eye lashes so that the same are set and will be retained in this condition for a considerable length of time.

Figure 1:
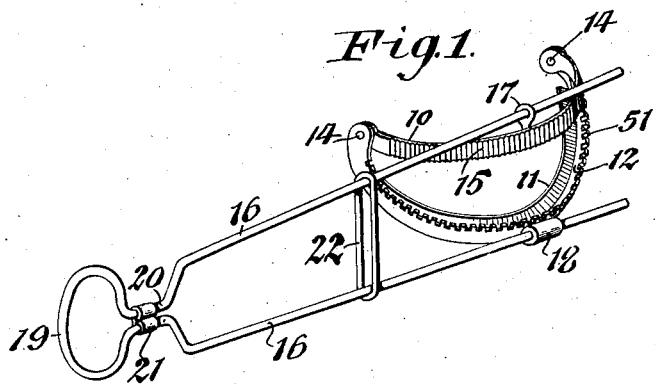
Figure 2:
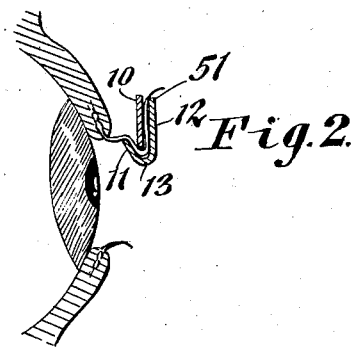
Figure 3:
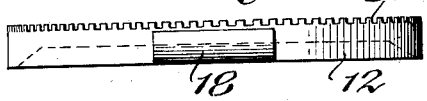
Figure 4:
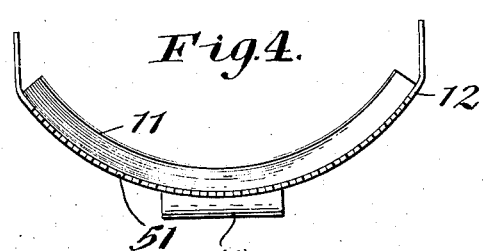

In the accompanying drawings:

Figure 1 is a perspective view of one form of eye lash crimper capable of carrying out the method of my invention. Figure 2 is a vertical cross section, showing my invention applied to the eye lashes of the upper eye lid. Figure 3 is a front elevation, partly in section, of one of the jaws of the eye lash crimper. Figure 4 is a top plan view of the same.

Similar characters of reference refer to like parts throughout the several views.

In its general organization the eye lash crimper, shown in the drawings as an example of one form suitable for practicing my invention comprises two jaws which are relatively movable and adapted to receive the eye lashes between them, said jaws being curved and pivoted to turn about axes which are arranged at right angles to the axis upon which the jaws are curved.

In the preferred construction, one of the jaws 10 is constructed of a single strip or ply of metal which is curved about a vertical axis, while the other jaw is composed of a strip of sheet metal which is doubled upon itself, so as to form two walls, strips or plies 11 and 12, which are connected with each other at one pair of their longitudinal edges, as shown at 13, so that in effect this jaw has the form of a channel. The plies, strips or walls of this channel-shaped jaw are curved about the same vertical axis about which the single guide jaw 11 is curved, and the two jaws are pivotally mounted so that they are capable of swinging vertically relatively to each other for the purpose of engaging the single ply jaw with the channel of the two-ply jaw. For this purpose, the opposite ends of the single ply jaw are preferably connected pivotally with the ends of the channel-shaped jaw by means of horizontal pivot pins 14 connecting the corresponding ends of two jaws, as shown in Fig. 1.

Upon placing two jaws along opposite sides of the eye lashes of an eye in a position in which these jaws conform substantially to the curvature of the eye and eye lashes, and then moving these two jaws toward each other while the eye lashes are between the same, the single ply jaw will enter the channel of the two ply jaw and bend the adjacent parts of the eye lashes downwardly into the channel shaped jaw, as shown in Fig. 2. The fit between the single ply jaw and the two ply jaw is preferably so determined that these jaws will engage frictionally with the eye lashes and when the jaws are held in engagement with the eye lashes for a short time in this manner, a crimp will be produced in the same which will remain therein for a considerable length of time.

When the hair of the eye lashes are comparatively thick, there is little, if any, tendency for the eye lashes to creep lengthwise of the gripping jaws while the latter are being applied thereto, but such creeping is liable to occur when the hair of the eye lashes is comparatively thin. To avoid such creeping of the eye lashes lengthwise of the jaws which otherwise would have the tendency to bunch them and produce an uneven form, the front face of the single ply jaw is provided with a plurality of upright corrugations 15 which extend over that portion of the area of this single ply jaw which is adapted to engage with the hair of the eye lashes and the upper edge of the outer wall 12 of the two ply jaw is provided with a longitudinal row of teeth 51 so that in effect the front side of the single ply jaw and the upper edge of the front ply of the other jaw form two combs which upon engaging the hair of the eye lash will keep these individual filaments of the hair apart from each other and thus produce an even crimping of the entire eye lash, instead of permitting the same to gather in bunches or in uneven masses.

In the use of this device it is preferable to engage the single ply jaw with the outer side of the eye lashes and then move the two ply jaw toward the single ply jaw for the purpose of crimping the hair of the eye lashes between the same, inasmuch as this permits of more definitely using the crimping device on the particular part of the eye lash on which the crimping effect is to be produced. In practice, it has been found that when this crimping device is left on the eye lashes for a period of approximately two minutes that an effective crimp is produced on the eye lashes which will remain for about two days.

The jaws of this eye lash crimper may be operated by any suitable means, but preferably by the means which are shown in the drawings, and which are so organized that they may be reversed and enable the eye lash crimper to be used most effectively on either eye, while the hand is raised at the side of the head. These means as shown in Fig. 1, comprise a pair of tong or operating bars 16, 16 which engage their free inner ends detachably with eyes 17 and 18 formed respectively on the upper edge of the single ply jaw and the front side of the front ply of the two ply jaw, while their outer ends are connected by means of a loop 19 which is formed integrally therewith. Between the bars 16 and loop 19, the wire of which the same are constructed, is contracted to form a neck 21 which receives a retaining clip 20, so that the loop 19 forms a rigid handle for holding the eye lash crimper. The wire of which the tong bars and handle are constructed is preferably resilient, so that the normal tendency of the bar 16 is to spread and retain the two jaws of the crimper in an open position. The extent of this opening movement is however preferably limited by means of a stop loop 22 which embraces both operating rods 16 about midway of their length and is permanently secured at one end to one of these rods while the other rod is capable of sliding in this link. By this means this link serves not only to stop or arrest the separating movement of these rods and the jaws of the crimper when the same have reached a predetermined position, but this link also serves to hold these rods in a definite position relative to each other.

In the use of this device, the two jaws may be held in front of the eye and in engagement with the upper eye lash by holding the handle of the operating rods at one side of the head. Upon removing the operating rods and reversing the engagement of the same with the coupling eye of the crimping jaws and then replacing the same on these jaws in a reverse position, the device can be used on the lash of the other eye from the opposite side of the head.

By means of this device the eye lashes of both eyes can be quickly crimped with ease and facility and enable persons to improve their looks by reason of the fact that when the eye lashes are crimped they are turned upwardly to some extent and present a wider and darker appearance, thus serving as a desirable adjunct to a toilet outfit.

Furthermore, the eye lashes when thus crimped make the same appear longer and the eyes wider due to the eye lid and the surrounding portions of the eyes forming a background for the crimped eye lashes.

I claim as my invention:

1. An eye lash crimper comprising two relatively movable curved jaws which are adapted to receive the eye lashes between them, said jaws being pivotally connected to turn about axes arranged at right angles to the axis about which the same are curved.

2. An eye lash crimper comprising two relatively movable curved jaws which are adapted to receive the eye lashes between them, said jaws being pivotally connected to turn about axes arranged at right angles to the axis about which the same are curved, one of said jaws consisting of a single ply while the other jaw consists of two plies which receive the single ply between them.

3. An eye lash crimper comprising two relatively movable curved jaws which are adapted to receive the eye lashes between them, said jaws being pivotally connected to turn about axes arranged at right angles to the axis about which the same are curved, one of said jaws consisting of a single ply while the other jaw consists of two plies which receive the single ply between them and which are connected at one of their corresponding longitudinal edges to form a channel.

4. An eye lash crimper comprising two relatively movable curved jaws which are adapted to receive the eye lashes between them, said jaws being pivotally connected to turn about axes arranged at right angles to the axis about which the same are curved, and one of said jaws having a comb like surface.

5. An eye lash crimper comprising two relatively movable curved jaws which are adapted to receive the eye lashes between them, said jaws being pivotally connected to turn about axes arranged at right angles to the axis about which the same are curved, one of said jaws consisting of a single ply while the other jaw consists of two plies which receive the single ply between them, said single ply having a comb like front surface.

6. An eye lash crimper comprising two relatively movable curved jaws which are adapted to receive the eye lashes between them, said jaws being pivotally connected to turn about axes arranged at right angles to the axis about which the same are curved, one of said jaws consisting of a single ply while the other jaw consists of two plies which receive the single ply between them, said single ply having a comb like front surface and the front ply of the two ply jaw having a comb like upper edge.

7. An eye lash crimper comprising two relatively movable curved jaws which are adapted to receive the eye lashes between them, said jaws being pivotally connected to turn about axes arranged at right angles to the axis about which the same are curved, and means for moving said jaws toward and from each other.

8. An eye lash crimper comprising two relatively movable curved jaws which are adapted to receive the eye lashes between them, said jaws being pivotally connected to turn about axes arranged at right angles to the axis about which the same are curved, and means for moving said jaws toward and from each other comprising a pair of tong rods having their outer ends connected with each other and their inner ends connected respectively with said jaws.

9. An eye lash crimper comprising two relatively movable curved jaws which are adapted to receive the eye lashes between them, said jaws being pivotally connected to turn about axes arranged at right angles to the axis about which the same are curved, and means for moving said jaws toward and from each other comprising eyes arranged on the front parts of said jaws, and a pair of tong rods having their outer ends connected with each other and their inner ends slidably engaging with said eyes.

10. An eye lash crimper comprising two relatively movable curved jaws which are adapted to receive the eye lashes between them, said jaws being pivotally connected to turn about axes arranged at right angles to the axis about which the same are curved, and means for moving said jaws toward and from each other comprising eyes arranged on the front parts of said jaws, and a pair of tong rods having their outer ends connected with each other and their inner ends slidably engaging with said eyes, and means for limiting the separating movement of said tong rods.

11. An eye lash crimper comprising two relatively movable curved jaws which are adapted to receive the eye lashes between them, said jaws being pivotally connected to turn about axes arranged at right angles to the axis about which the same are curved, and means for moving said jaws toward and from each other comprising eyes arranged on the front parts of said jaws, and a pair of tong rods having their outer ends connected with each other and their inner ends slidably engaging with said eyes, and means for limiting the separating movement of said tong rods comprising a link secured to one of said rods and slidably receiving the other rod.

12. An eye lash crimper comprising two relatively movable curved jaws which are adapted to receive the eye lashes between them, said jaws being pivotally connected to turn about axes arranged at right angles to the axis about which the same are curved, and means for operating said jaws which are detachably connected therewith and reversible relatively thereto.

13. An eyelash crimper comprising two jaws which are curved concentrically and movable toward and from each other and receive the eye lashes between them, the direction of movement of said jaws being substantially parallel with the axes of the same.

14. An eye lash crimper comprising a lower jaw, and an upper jaw between which and the lower jaw the hairs of the eye lash are adapted to be crimped, said upper jaw being provided on its upright hair engaging face with a plurality of upright corrugations which are arranged in a horizontal row and which serve to hold the several hairs apart and in an upright position.

15. An eye lash crimper comprising a lower jaw, and an upper jaw between which and the lower jaw the hairs of the eye lash are adapted to be crimped, said upper jaw being provided on its upright hair engaging face with a plurality of upright corrugations which are arranged in a horizontal row and which serve to hold the several hairs apart and in an upright position, and said lower jaw being provided at its upper edge and in front of said upper jaw with a horizontal row of upwardly projecting teeth, which serve to comb out the hair filaments before the same are engaged by the upright corrugations of the upper jaw, whereby the individual filaments of the hair are maintained in an evenly distributed condition.

16. An eyelash curler comprising cooperating jaws, one having a gripping edge curved to fit about the eyelid and the other having substantially parallel curved ridges spaced to receive the gripping edge of the first jaw.

17. An eyelash curler comprising cooperating eyelash clamping jaws curved to fit about the eyelid and one of said jaws having closely spaced grooves extending transversely across the face of the same for separating and guiding the lashes.

CHARLES W. STICKEL.